Sept. 29, 1959  A. BRUEDER  2,906,247
POWER STEERING MECHANISM FOR MOTOR VEHICLES
Filed Nov. 23, 1954  2 Sheets-Sheet 2
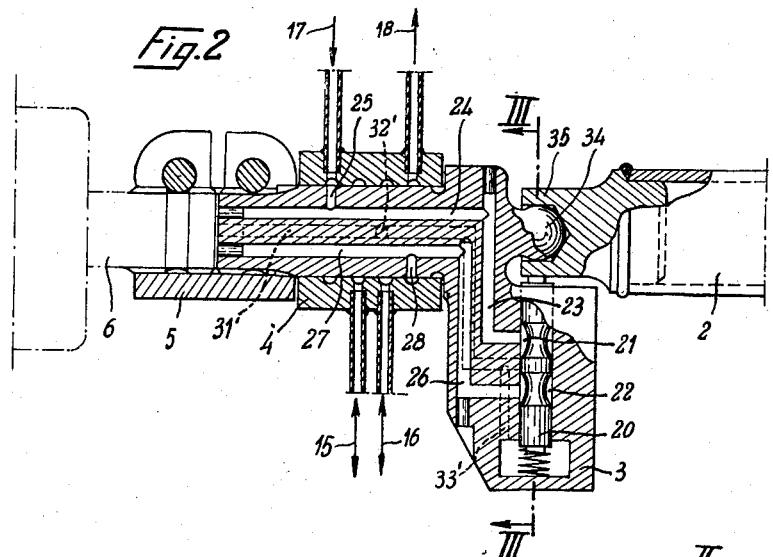
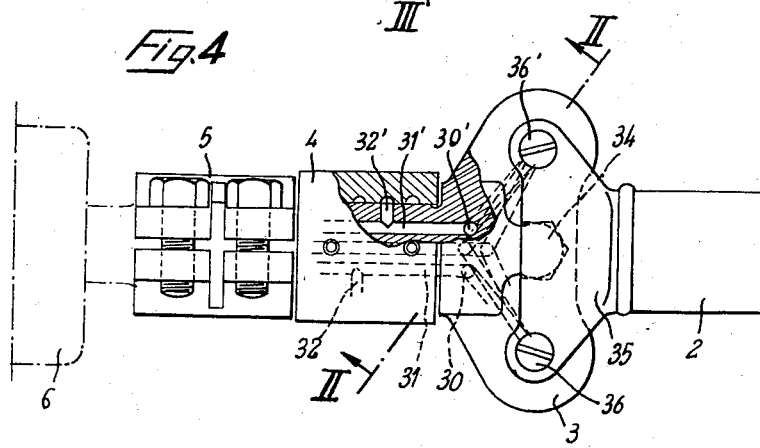
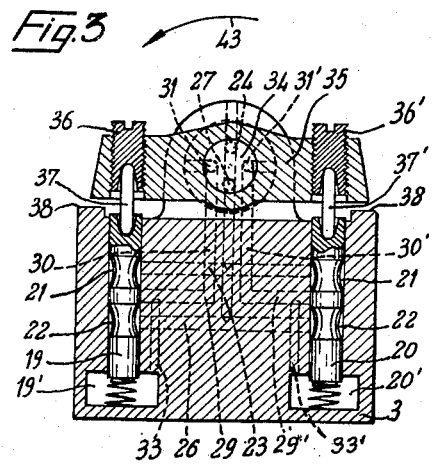

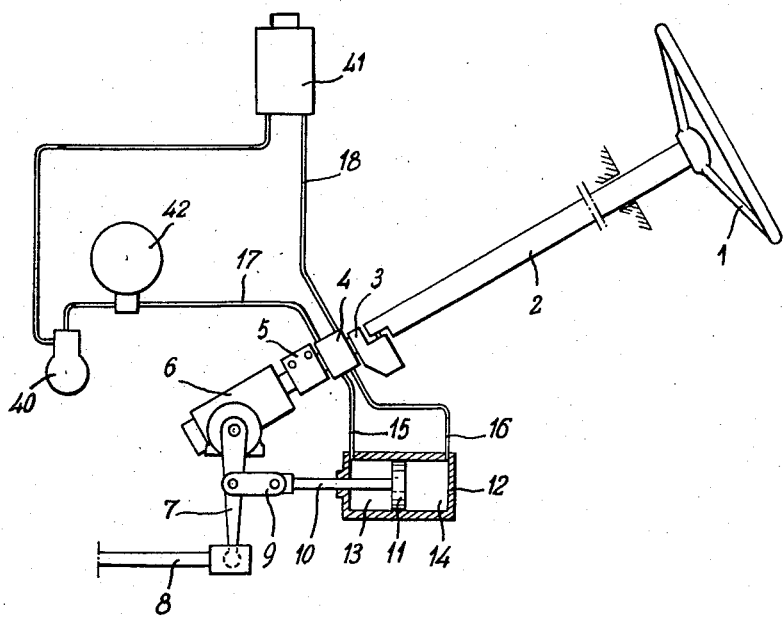

United States Patent Office 2,906,247
Patented Sept. 29, 1959

2,906,247

POWER STEERING MECHANISM FOR MOTOR VEHICLES

Antoine Brueder, Paris, France, assignor to Societe Anonyme Andre Citroen, Paris, France, a French corporation Application November 23, 1954, Serial No. 470,744

Claims priority, application France May 10, 1954

2 Claims. (Cl. 121—41)

This invention relates to a steering gear for motor vehicles, in which the force exerted by the driver is amplified by means of a fluid under pressure.

All servo-systems in which a certain degree of precision is sought to be obtained require to operate without friction and without appreciable delay. Thus it is that in the particular instance of a servo-type steering means for motor vehicles the value of the force transmitted must be felt instantaneously by the driver. It is, therefore, a matter of transmitting from the steering gear a force which is strictly proportional to the torque applied to the wheel by the driver.

The device according to the invention accomplishes this object by means of a hydraulic distributor, which governs, in proportion to the torsional force applied to the steering column, the value of the fluid pressure transmitted to the cylinder in which there occurs the movement of the doubly-acting piston acting on the steering gear. For this purpose the hydraulic distributor rotates together with the steering column, the connection between the hydraulic source of the installation and the working cylinder being effected by means of channels provided in the bore of a fixed coupling member and communicating through the medium of orifices provided in a cylindrical portion of the rotary distributor with distributing slide valves actuated by the steering wheel.

A servo-type steering gear for motor vehicles according to the invention will now be described, by way of example and without limitation, with reference to the accompanying drawings, in which:

Fig. 1 illustrates diagrammatically the device as a whole;

Fig. 2 shows the rotary distributor and the parts associated therewith in sectional view along the line II—II in Fig. 4;

Fig. 3 is a cross-section through the parts shown in Fig. 2, taken along the line III—III in the latter figure;

Fig. 4 is a plan view, partially in section, of the parts illustrated in Fig. 2.

As shown in Fig. 1, the steering gear comprises the steering wheel 1, the steering column 2, the distributor 3 which includes a fluid flow unit which contains passageways 24, 27 and an integral valve unit which contains passageways 23, 26 communicating with passageways 24, 27, respectively, the connector 4, the cross bar 5, the steering gear casing 6 and the lever 7, to which is pivotally connected the control rod 8. With the lever 7 there is coupled by means of a link 9 a rod 10 integral with the piston 11 which is arranged for movement in the cylinder 12.

A pump 40 draws liquid from the reservoir 41 and delivers it under pressure to the hydraulic accumulator 42. The pressure is transmitted to the chamber 13 or to the chamber 14 of the cylinder 12 according to the direction of the force exerted by the driver on the wheel 1, while the second chamber 14 or 13 respectively is placed in communication with the reservoir 41. The pipes 15 and 16 establish communication between the chambers 13 and 14 and the distributor 3 through the medium of the connector 4. The pipes 17 and 18 connect the distributor 3 with the accumulator 42 and with the reservoir 41.

The valve unit of the distributor 3, which is illustrated in detail in Figs. 2, 3 and 4, comprises two bores in which are movable the slide valves 19 and 20. The slide valves, which are cylindrical in form, possess two channels 21 and 22 communicating respectively with the pressure intake passages 23, 24, 25 and with the escape passages 26, 27, 28.

The cylindrical portion which separates the two channels 21 and 22 covers in the position of rest a passage 29 or 29', the width of this cylindrical portion being slightly greater than the diameter of the passage 29. The passage 29 of each distributor communicates with the pipes leading to the cylinder 12 by way of the passages 30, 31, 32 or 30', 31', 32'. The passages 29 and 29' are also in communication with the ends 19' and 20' of the slide valves 19 and 20 by way of the passages 33 and 33'.

The passages 25 (pressure intake), 28 (return to the reservoir), 32 and 32' (connection with the chambers 13 or 14 of the cylinder 12) lead to a cylindrical portion of the body 3. On this cylindrical portion, which is capable of being turned together with the steering column, there is mounted freely, but with a very reduced play, the fixed connector 4, in which there are branched the pipes 15, 16, 17 and 18. Each pipe communicates with a circulating channel provided in the bore of the connector 4. These channels place the pipes 15, 16, 17 and 18 in communication with the passages 32, 32', 25 and 28 in the cylindrical portion of the double distributor.

The cylindrical part of the distributor terminates on the left in grooves which enable the apparatus to be connected with the steering gear pinion 6 through the medium of a coupling sleeve 5. On the right there is provided a spherical portion 34, the center of which is located in a plane passing through the axes of the two slide valves 19 and 20. This spherical portion serves to support and center the rocking member 35 integral with the steering column 2. The rocking member 35 is furnished with two regulating screws 36 and 36'. These screws are hollow and serve to house two links 37 and 37' (Fig. 3) effecting mechanical connection between the part 35 and the valves 19 and 20. These screws permit of exact regulation of the position of the middle cylindrical portions of the slide valves in relation to the passages 29 and 29'. The dimensions of the different parts are, however, so determined that the upper ends of the links 37 and 37' are located substantially in a line passing through the axis of the spherical member 34.

The ends of the rocking member 35, which is moved in angular fashion in relation to the body portion 3, enters in the extreme positions into contact with the abutments 38 on the body 3.

The conical form of the housings for the links 37 in the screws 36 and at the upper ends of the slide valves 19 and 20, and also the spherical form of the ends of the links and of the centering means 34 in respect to the rocking portion 35, permit an appreciable absence of alignment between the axis of the steering gear 6 and the axis of the steering column 2 without risk of constraint brought about by friction, and accordingly of lack of precision.

The operation of the device described is as follows:

When the driver turns the wheel 1, for example in the direction of the arrow 43 (Fig. 3), he actuates the rocking member 35 which, through the medium of the link 37, presses against the valve 19 This has the effect of placing the passage 29 which, through the medium of 30, 31, 32 and 16, leads to the chamber 14, in communication with the pressure intake 23 by way of the passage 17, the opening 25 and the passage 24. The pressure accordingly increases in the chamber 14, but the same pressure is brought to bear by way of the passage 33 on the bottom of the valve 19, and in consequence it seeks to move the latter with a force which is strictly proportional to the force transmitted to the piston 11 acting on the steering gear. If the driver wishes to continue to pass liquid towards 14 under the same pressure, he will be required to maintain the force applied in turning the wheel, because the inner parts of the steering gear 6 in moving the body portion 3 in the direction of the arrow 43 are turned in proportion to the displacement of the piston 11 in actuating the lever 7.

The pressure which acts on the piston 11 also forces liquid from the chamber 13 towards the slide valve 20 of the distributor, this valve, urged by a light spring, being in the position of release, as the member 35 has been rocked towards the left by the action of the driver. If the driver discontinues his action on the wheel, the steering gear ceases to turn, the distributor valves being again compelled to assume their initial position, as if on the bottom of one of the slide valves a pressure is effective which is greater than that acting on the bottom of the other valve, there will immediately result a lack of equilibrium on the part of the rocking member, which will be rocked in the necessary direction to re-establish pressure equilibrium.

The steering gear as described represents merely a specific embodiment of the invention, and the scope of the latter is obviously not limited to the structural details, which are illustrated in the drawings and have been shown solely for the purpose of better comprehension of the invention. Thus, for example, the invention may naturally be applied to steering gears of other kinds than those contemplated in the above, the skilled man being capable of applying to the arrangement as described modifications in detail within the scope of the present invention.

I claim:

1. In a motor vehicle, in combination, a steering column and a device for controlling a fluid motor, said device being adapted to be connected between the fluid motor and a source of fluid under pressure, said device comprising, in combination, a fluid flow unit mounted co-axially and colinearly with said steering column at the lower end thereof, said unit having first passageways adapted to communicate with the fluid motor and second passageways adapted to communicate with the source of fluid and including an integral valve unit for controlling the flow of fluid through said fluid flow unit, said valve unit being provided with a pair of bores and with passageways communicating with said bores and with the passageways of the fluid flow unit, a pair of valve elements slidably positioned in said valve unit for controlling the flow of fluid therethrough, means acting upon and engaging one end of said valve elements for moving them axially to control their position in said valve unit relatively to the passageways in the valve unit, and an actuating member carried by said steering column and pivotally disposed above said last-named means for selective engagement therewith, said actuating member being rigidly connected with said steering column and being rotated upon rotation of the steering column, and said fluid flow unit with its integral valve unit being rotatable by the actuating member after limited movement of said member to position said valve elements in said valve unit, said device further including a non-rotatable outer shell adapted to be connected to the fluid motor and the fluid source and said fluid flow device integral with said valve unit being rotatable within said shell for rotation therein upon rotation of the actuating member.

2. In a motor vehicle, in combination, a steering column and a device for controlling a fluid motor, said device being adapted to be connected between the fluid motor and a source of fluid under pressure, said device comprising, in combination, a fluid flow unit mounted co-axially and colinearly with said steering column at the lower end thereof, said unit having first passageways adapted to communicate with the fluid motor and second passageways adapted to communicate with the source of fluid and including an integral valve unit for controlling the flow of fluid through said fluid flow unit, said valve unit being provided with a pair of bores and with passageways communicating with said bores and with the passageways of the fluid flow unit, a pair of valve elements slidably positioned in said valve unit for controlling the flow of fluid therethrough, means acting upon and engaging one end of said valve elements for moving them axially to control their position in said valve unit relatively to the passageways in the valve unit, and an actuating member carried by said steering column and pivotally disposed above said last-named means for selective engagement therewith, said actuating member being rigidly connected with said steering column and being rotated upon rotation of the steering column, and said fluid flow unit with its integral valve unit being rotatable by the actuating member after limited movement of said member to position said valve elements in said valve unit, said actuating member having wings positioned in alignment with each of said bores and adjusting means for varying the axial position of the means acting upon said valve elements.

References Cited in the file of this patent

UNITED STATES PATENTS

| | | |
|---|---|---|
| 2,261,444 | Neubert | Nov. 4, 1941 |
| 2,345,531 | De Ganahl | Mar. 28, 1944 |
| 2,360,542 | Berry | Oct. 17, 1944 |
| 2,682,929 | Almond | July 6, 1954 |
| 2,685,342 | Lauck | Aug. 3, 1954 |